July 14, 1925.
R. C. CHARLTON
SAW TOOTH
Filed Feb. 4, 1925
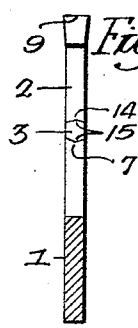
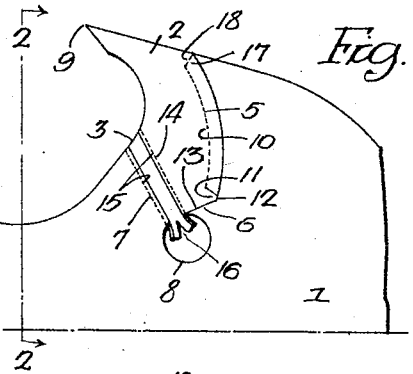
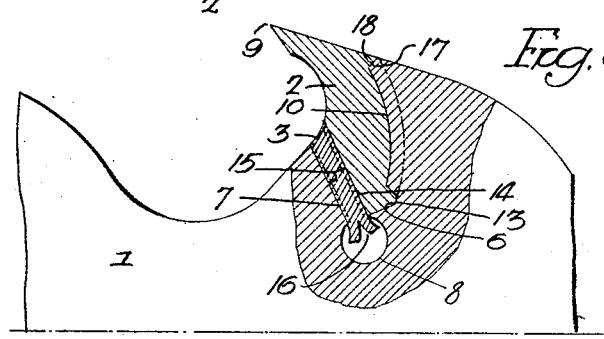
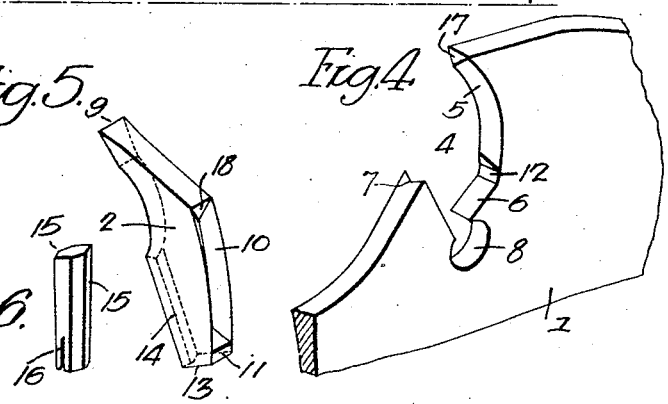
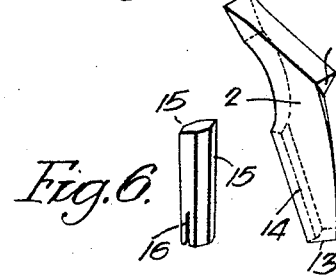
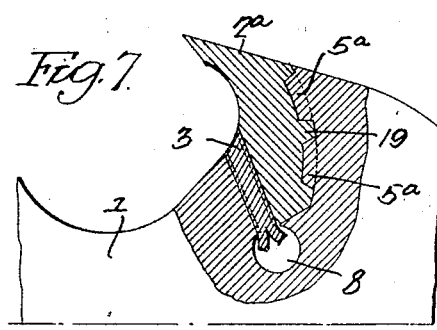
Inventor-
Richard C. Charlton
by his Attorneys:
Howson & Howson Patented July 14, 1925.

1,546,201

UNITED STATES PATENT OFFICE.

RICHARD C. CHARLTON, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

SAW TOOTH.

Application filed February 4, 1925. Serial No. 6,753.

*To all whom it may concern:*

Be it known that I, RICHARD C. CHARLTON, a citizen of the United States, residing in Philadelphia, Pennsylvania, have invented certain Improvements in Saw Teeth, of which the following is a specification.

The object of this invention is to improve the construction of the means for securing a detachable saw tooth to a saw blade.

The invention is especially adapted to circular saws of the insertable tooth type.

In the accompanying drawings:

Fig. 1 is a side view of a portion of a circular saw, illustrating an insertable tooth and my improved means of attaching the tooth to a blade;

Fig. 2 is a sectional view on the line 2—2 Fig. 1;

Fig. 3 is a side view, partly in section;

Fig. 4 is a detached perspective view of a portion of a saw blade with the tooth removed;

Fig. 5 is a detached perspective view of a tooth;

Fig. 6 is a detached perspective view of the wedge, which is used to secure the tooth to the blade; and Fig. 7 is a view illustrating a modification of the invention.

Referring to the drawings, 1 is a portion of the body or blade of a circular saw. 2 is a tooth. 3 is a wedge, which is used to fasten a tooth in position in the blade. The rear wall of the recess 4 in the blade 1 is curved and has a beveled rib 5 that terminates short of an abutment 6 at the lower end. The outer end of this rib is beveled, as at 17. The front wall of the recess has a V-shaped groove therein, as at 7. The blade has a transverse opening 8 into which the wedge 3 extends, as shown clearly in Fig. 1. The tooth 2 has a cutting edge 9 of any usual form and has a V-shaped groove 10 at the back, into which extends the V-shaped rib 5. The heel 11 of the tooth fits the recess 12. The shoulder 18 of the tooth rests against the end 17 of the rib. This construction prevents the movement of the tooth.

The tooth 2 has a V-shaped groove 14 in its front edge. The wedge 3 has a rib 15 at each edge. The ribs are adapted to the V-shaped groove 7 in the blade and the groove 14 in the front edge of the tooth. This wedge is driven in between the tooth and the blade, as shown in Fig. 1.

The small end of the wedge is slotted, as at 16, so that, when the wedge is driven into position, the ends of the wedge can be spread, as in Fig. 3, which will retain the wedge in position.

By this construction, the tooth is held rigidly in the saw blade. The rib 5 prevents the tooth moving in either direction, while the wedge holds the tooth firmly against the back of the recess.

In Fig. 7, a modification is illustrated, in which an abutment 19 is formed at the back of the tooth $2^a$ and the rib $5^a$ is made in two sections spaced apart. The abutment extends into the space.

I claim:

1. The combination of a saw blade having a recess for a tooth, the rear wall of the recess being curved, said wall having a beveled rib thereon; an abutment at the bottom of the recess; a tooth fitting the recess and resting against the abutment, the rear of the tooth conforming to the shape of the outer wall of the recess and having at its lower end a heel, which fits under the rib, and having, at the upper end, a shoulder, which fits over the rib; and a wedge located between the tooth and the front wall of the recess for retaining the tooth in the recess.

2. The combination of a saw blade having a recess therein, the outer wall of the recess being curved and having a beveled rib thereon; an abutment at the base of the recess, each rib stopping short of the abutment; a V-shaped groove in the front wall of the recess, the blade having an opening communicating with the recess; a tooth mounted in the recess, the rear of the tooth having a beveled recess therein; a heel at the lower end and an abutment at the upper end of said groove, said groove fitting the rib at the rear wall of the recess of the blade, the front of the tooth having a V-shaped groove; and a wedge having a V-shaped rib at each edge fitting the groove in the tooth and in the blade, the small end of the wedge being slotted to allow the wedge to be spread when driven and to retain the wedge in the position in which it is adjusted.

RICHARD C. CHARLTON.